Patented Dec. 29, 1925.

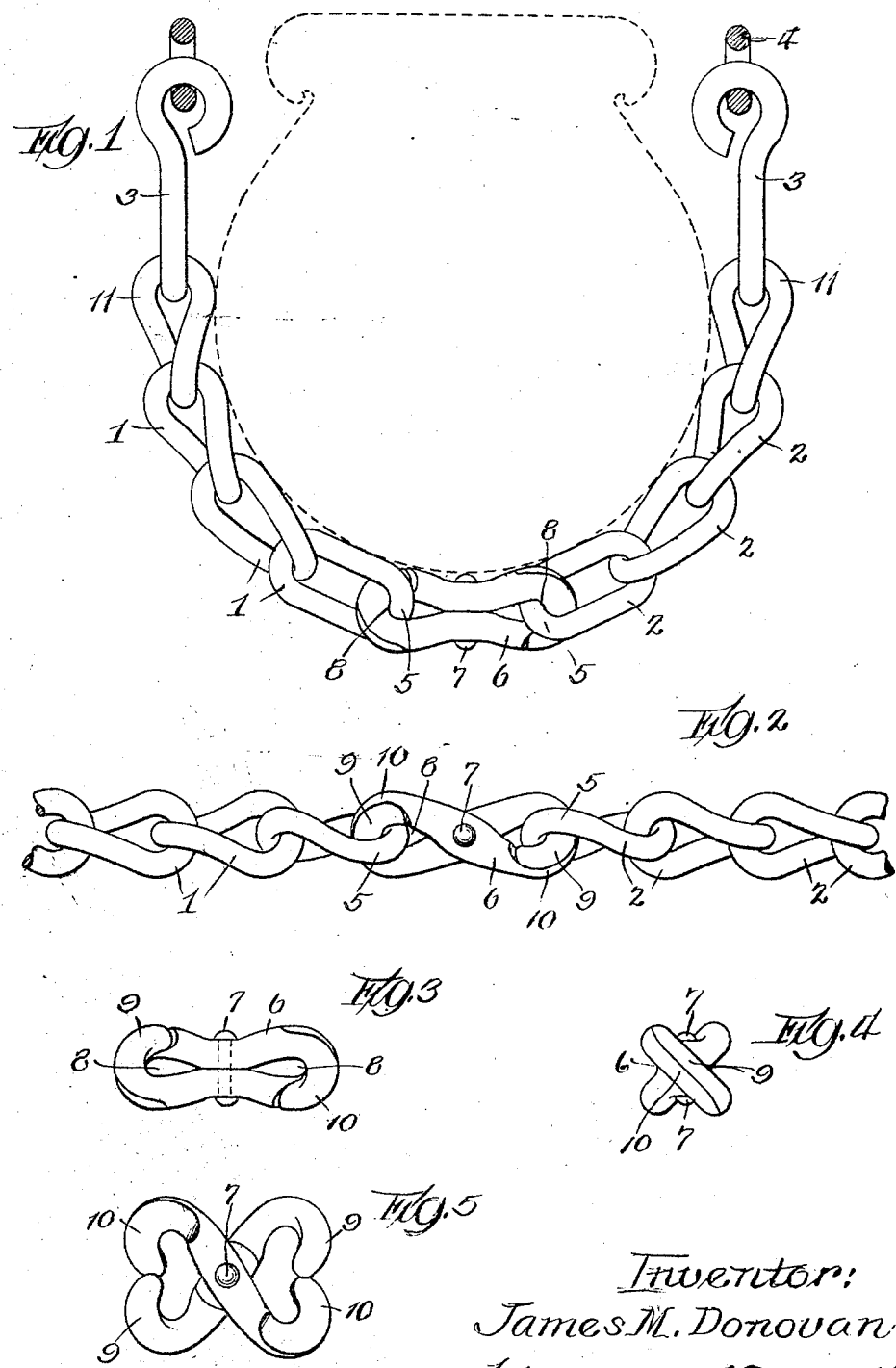

1,567,426

UNITED STATES PATENT OFFICE.

JAMES M. DONOVAN, OF CHICAGO, ILLINOIS.

VEHICLE TIRE-CHAIN REPAIR-LINK CONSTRUCTION.

Application filed May 27, 1922. Serial No. 564,086.

*To all whom it may concern:*

Be it known that I, JAMES M. DONOVAN, a citizen of the United States, and a resident of Chicago, Cook County, Illinois, have invented a certain new and useful Improvement in Vehicle Tire-Chain Repair-Link Constructions, of which the following is a specification.

This invention relates to chains for vehicle wheels, more particularly to those used on automobile tires to prevent skidding as well as to increase the traction of the wheels, and the invention relates more particularly to what are called repair links for mending broken or worn chains of this kind.

Generally stated, therefore, the object of the invention is to provide an improved construction and arrangement whereby the repair link which is designed and intended to be inserted in the middle portion of one of the transverse chains is so formed and so connected in the chain that it will not be likely, after becoming somewhat worn on one side, to turn over and cut or injure the tread of the tire, and whereby a link of this kind is adapted to be inexpensively manufactured and easily applied to or removed from the chain on the tire.

It is also an object to provide certain details of construction tending to increase the general efficiency and desirability of a pneumatic tire chain repair link of this particular character.

To these and other useful ends the invention consists in matter hereinafter set forth and claimed and shown in the accompanying drawings in which—

Figure 1 is a view transversely through a pneumatic tire, showing the tire in dotted lines, and showing a tire chain connected in position thereon and equipped with a repair link embodying the principles of the invention.

Figure 2 is a plan view of said chain and repair link viewed in a direction at right angles to the direction which the same are viewed in Figure 1.

Figure 3 is a side elevation of the repair link.

Figure 4 is an end elevation of said repair link.

Figure 5 is a top or plan view of said repair link, in the position in which it is shown in Figure 2, but with the two pivotally connected sections of the link turned at an angle to each other to show the positions thereof when the link is being inserted in or removed from the chain.

As thus illustrated, the invention comprises a chain composed of links 1 and 2 forming the two side sections of the chain, having the end links provided with hooks 3, for engagement with the other chains 4 that ordinarily extend around the edges of the wheel rim to hold these transverse chain sections in position across the tread of the tire. The two sections comprising the links 1 and 2 are so formed that the adjacent ends 5 of these sections are substantially at right angles to each other, just as they would be if joined directly together, in order to extend through the eyes of a central link 6 which constitutes the so-called repair link. This repair link comprises two sections which are pivotally connected together by a transverse pivot 7, and the opposite ends or the two eyes 8 of the link are not disposed in vertical planes, it will be seen, but are disposed in oppositely inclined planes, at right angles to each other, as shown in Figure 4, thereby to harmonize with the links 1 and 2 of the chain. The axis of the pivot 7 passes through the two planes where they intersect each other. In other words, this repair link is given a twist similar to the other links, or substantially so, as the opposite ends of any link 1 or any link 2 are practically or very nearly at right angles to each other, when the link is viewed in end elevation, these links being twisted substantially in this manner. Thus the repair link has one section thereof provided with portions 9 which overlap the end portions 10 of the other section. With this construction, the end portions 5 of the two chain sections can easily be inserted in and removed from the eyes 8 of the repair link, by first spreading the two sections of the repair link apart as shown in Figure 5, and by inserting the end portions 5 between the portions 9 and 10 far enough and in a way to permit the portions 9 and 10 to then be closed together as shown in Figures 1, 2, 3, and 4, and when this is done the repair link cannot be removed except by manipulating the links 1 and 2 in a way to permit the two sections of the repair link to be again spread apart as shown in Figure 5, so that the end portions 5 can be slipped out from between the two portions 9 and 10 of each eye of the repair link.

Now with this construction the repair link is on the tread of the tire and is subject to most wear. However, with this construction and arrangement, it is contemplated that the worn portion of the repair link cannot come into contact with the tread of the tire, should the repair link turn over in either direction, inasmuch as a half turn or less of the repair link, in either direction, will tighten either the links 1 or the links 2 and prevent further rolling over of the repair link. It will be seen, of course, that a chain composed of links such as the links 1 and 2 will tighten very quickly and prevent twisting in one direction, but will twist farther in the opposite direction. It is desirable to use this type of link and chain, and by using the chain in two sections, as shown, either section is operative to limit the twisting or rolling over of the repair link when the latter strikes the ground, and especially so when this link is used on the rear wheels of an automobile, as in such case the traction of the wheel on the ground tends to twist the chain. The repair link does not lie flatwise on the tread of the tire, as it is not flat, and should it roll partly over in either direction, only one end will then rest flat on the tire and only one end will rest edgewise against the tire, for it has a substantial twist, as shown very clearly in Figure 4, so that it more nearly approximates the type of link employed for the balance of the chain, and harmonizes therewith. The links 1, for example, will tighten very quickly when any attempt is made to twist the repair link in one direction and the links 2 will tighten almost immediately when any attempt is made to twist the repair link in the opposite direction, thus imposing a limitation on the extent to which the repair link can twist or roll over in either direction. Normally, the pivot 7 extends radially of the tread of the tire, and the plane of this pivot is at an angle to the plane of either eye of the link, as shown in the drawings, (see Figure 4). But while the link 6 is shown as having a right angle twist, it will be understood that it may have a twist of any suitable character.

It will be seen that the repair link, by reason of its formation, is not adapted to be presented flatwise to the tread of the tire, and hence when the chain is hooked into position the link does not lie flatwise against the tire, in normal position, and cannot turn over and present a full length edge to the tire. While permitting some rolling motion of the link, the arrangement resists such rolling motion, in either direction, and tends to prevent the outer wearing side of the repair link from turning over or injuring or cutting the tread of the tire. When the link turns or rolls in either direction, as it must, it merely thereby presents one end portion more flatwise to the tire. The ends 11 of the chain are at right angles to the hooks 3, so that in plan view only the repair link 6 and the two adjacent links 1 and 2 appear to have a figure 8 formation, (see Figure 2) and the other links 1 taper one way and the other links 2 taper in the opposite direction. The invention is not limited to the exact twist shown for the repair link, as shown and described, or to the exact construction disclosed.

What I claim as my invention is—

1. A repair link for vehicle tire chains, comprising two link sections pivotally connected between their ends and formed at each side of the pivotal point with curved portions which overlap to provide eyes to receive other links of the chain, said repair link being so formed that the two eyes thereof are disposed in planes extending at an angle to each other, so that the two eyes are disposed in different planes and cross each other at an angle when the link is viewed endwise thereof, with the axis of said pivotal point passing through the planes where they intersect each other, whereby said axis passes through each plane obliquely thereto, and said repair link is prevented from lying flatwise against the tread of the tire.

2. In a vehicle tire chain repair link construction, the combination of two link sections pivotally connected together between the ends thereof and formed with end portions to provide eyes at the opposite ends of the link, said eyes disposed in planes extending at an angle to each other, and the axis of said pivotal connection extending at the same angle to each plane, thereby to prevent the repair link from being capable of being presented flatwise to the tread of the tire.

JAMES M. DONOVAN.